US010129425B2

United States Patent
Suzuki

(10) Patent No.: US 10,129,425 B2
(45) Date of Patent: Nov. 13, 2018

(54) COMMUNICATION APPARATUS CAPABLE OF SHIFTING TO AT LEAST ONE OF A FIRST STATE AND A SECOND STATE IN WHICH LESS POWER IS CONSUMED THAN IN THE FIRST STATE, AND A CONTROL METHOD AND A NON-TRANSITORY COMPUTER-READABLE STORAGE MEDIUM FOR USE WITH SAME

(71) Applicant: CANON KABUSHIKI KAISHA, Tokyo (JP)

(72) Inventor: Takeshi Suzuki, Inagi-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 15/147,341

(22) Filed: May 5, 2016

(65) Prior Publication Data

US 2016/0344884 A1  Nov. 24, 2016

(30) Foreign Application Priority Data

May 19, 2015  (JP) ................................ 2015-102291

(51) Int. Cl.
*H04N 1/00* (2006.01)
*G06K 15/00* (2006.01)

(52) U.S. Cl.
CPC ....... *H04N 1/00891* (2013.01); *G06K 15/402* (2013.01); *H04N 2201/0094* (2013.01)

(58) Field of Classification Search
None
See application file for complete search history.

(56) References Cited

U.S. PATENT DOCUMENTS

| 2013/0111238 A1* | 5/2013 | Takahashi | H04N 1/00222 713/320 |
| 2013/0229685 A1* | 9/2013 | Naruse | G06F 3/1207 358/1.15 |
| 2013/0329253 A1* | 12/2013 | Sasaki | H04N 1/0035 358/1.15 |
| 2015/0185807 A1* | 7/2015 | Okuzono | G06F 1/3231 713/320 |

(Continued)

FOREIGN PATENT DOCUMENTS

| JP | 2004268399 A | 9/2004 |
| JP | 2012078955 A | 4/2012 |
| JP | 2012196770 A | 10/2012 |

(Continued)

*Primary Examiner* — Miya J Williams
(74) *Attorney, Agent, or Firm* — Canon U.S.A., Inc. IP Division

(57) ABSTRACT

A communication apparatus includes a control unit configured, when the communication apparatus is in a first state and when a receiving unit receives a request, from an external device, for data for a predetermined screen that is among a plurality of screens for remotely using the communication apparatus, not to execute control for delaying execution of a shifting process, and when the communication apparatus is in the first state and when the receiving unit receives a request, from the external device, for data for display of a screen that is not the predetermined screen and that is among a plurality of screens for remotely using the communication apparatus, to execute the control for delaying execution of the shifting process.

20 Claims, 11 Drawing Sheets

(56) References Cited

U.S. PATENT DOCUMENTS

2015/0242166 A1* 8/2015 Itaya .................... G06F 3/1221
358/1.14
2016/0275907 A1* 9/2016 Scott .................... G09G 5/006

FOREIGN PATENT DOCUMENTS

| JP | 2013183352 A | 9/2013 |
| JP | 2015003474 A | 1/2015 |

* cited by examiner

```
<HTML>
<HEAD>
<TITLE> · · · · </TITLE>
<meta http-equiv="refresh" content="10">
</HEAD>
<BODY>

· · · ·

</BODY>
</HTML>
```
801

FIG. 11

| MENU | | MAIN BODY SETTING |
|---|---|---|
| PRINTER STATE | | SILENT |
| UTILITY | | POWER SAVING SETTING |
| MAIN BODY SETTING | | PRINT SETTING |
| AirPrint SETTING | | SPECIAL SETTING |
| Web SERVICE CONNECTION SETTING | | INK-DRY WAITING TIME |
| SECURITY | | |
| SYSTEM INFORMATION AND LAN SETTING | | |
| UPDATE OF FIRMWARE | | |
| LANGUAGE SELECTION | | |
| [INSTRUCTION MANUAL] | | |

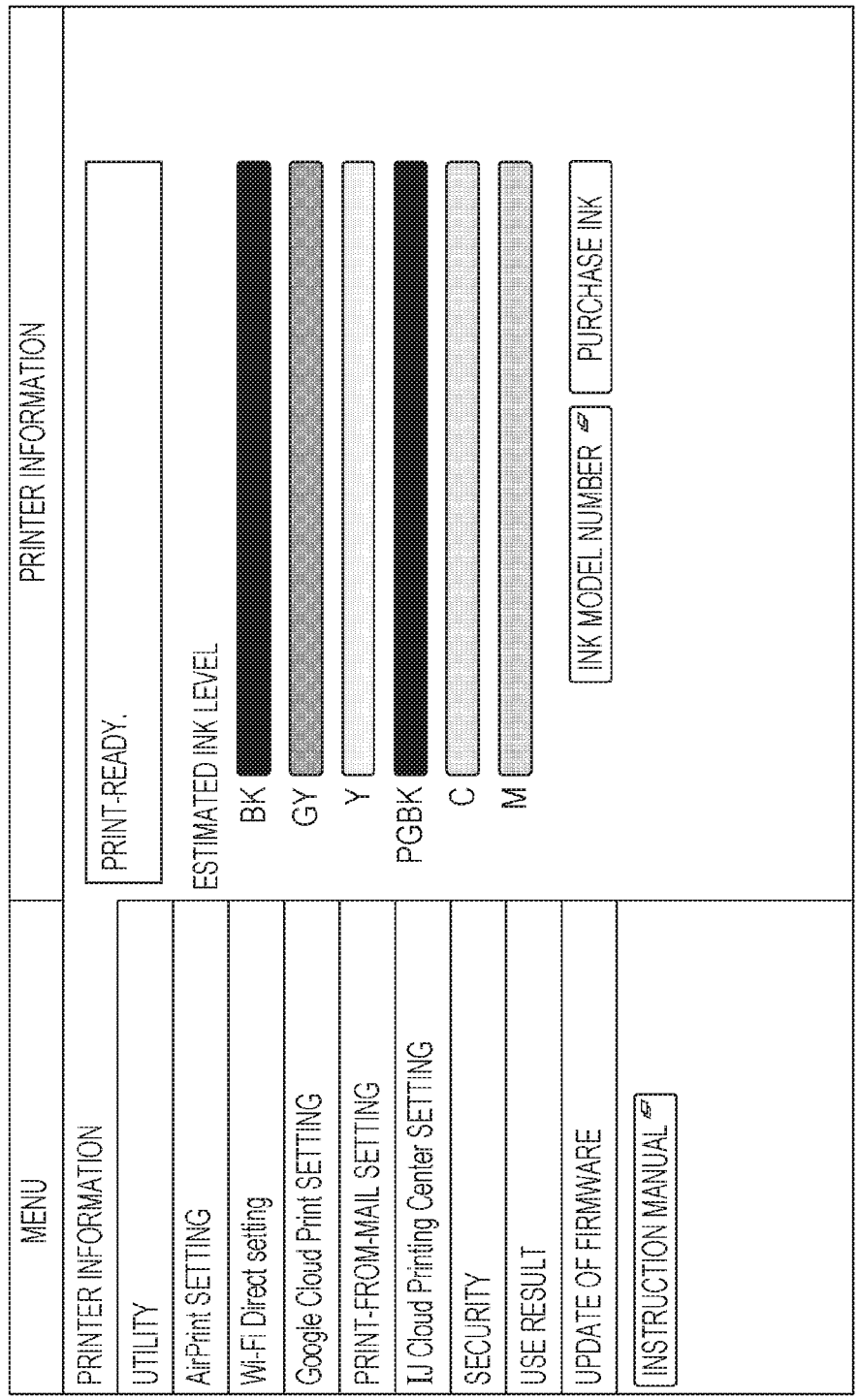

COMMUNICATION APPARATUS CAPABLE OF SHIFTING TO AT LEAST ONE OF A FIRST STATE AND A SECOND STATE IN WHICH LESS POWER IS CONSUMED THAN IN THE FIRST STATE, AND A CONTROL METHOD AND A NON-TRANSITORY COMPUTER-READABLE STORAGE MEDIUM FOR USE WITH SAME

BACKGROUND OF THE INVENTION

Field of the Invention

The present invention relates to a communication apparatus and a method and a computer readable medium.

Description of the Related Art

Due to growing awareness of energy saving, recent communication apparatuses, such as an image processing apparatus, are provided with an energy saving function. A known example of the energy saving function is an automatic power-off function. The automatic power-off function is the function of automatically shifting the state of a communication apparatus in the power-on state to the power-off state (a state in which power is less consumed than in the power-on state) when the communication apparatus is not accessed for a predetermined time or longer. There is a known automatic power-on function for enhancing the convenience of the automatic power-off function. The automatic power-on function is the function of automatically shifting the state of a communication apparatus in the power-off state to the power-on state when the communication apparatus is accessed.

Furthermore, there is a known function of displaying a screen for using the communication apparatus (hereinafter referred to as "remote use screen") on the display of an external device, such as a personal computer (hereinafter abbreviated as "PC") (hereinafter referred to as "remote use function). This function is implemented by a PC requesting data for the display of a remote use screen (corresponding to an access), from a communication apparatus, and by the communication apparatus responding to the request.

The user can perform various operations on the communication apparatus remotely, for example, changing various settings of the communication apparatus and cleaning, by inputting desired instructions to the remote use screen displayed on the PC. Furthermore, the user can check the state of the communication apparatus remotely by displaying a screen showing the state of the communication apparatus on the remote use screen.

In a situation in which the remote use screen is used by the user, the communication apparatus needs to be in the power-on state so that the communication apparatus can respond to a request for data for the display of the remote use screen, issued from the PC. Japanese Patent Laid-Open No. 2004-268399 discloses a communication apparatus which, when accessed from an external device, delays execution of the process of shifting from the power-on state to the power-off state. Japanese Patent Laid-Open No. 2015-3474 discloses a communication apparatus which, when accessed, automatically shifts from the power-off state to the power-on state.

However, if the access to the communication apparatus from the PC is a predetermined access, the communication apparatus may be kept in the power-off state.

For example, a request for data for displaying a remote use screen that is automatically updated and a request for data from a PC on which the remote use screen that is automatically updated is displayed may be issued not through user operation but automatically by the PC. Therefore, a situation in which the request is issued to the communication apparatus can be a situation in which the communication apparatus does not need to respond to the request, such as when the request is automatically repeated by the PC although the user leaves the PC unused. Under such a situation, the communication apparatus may be in the power-off state.

The communication apparatus disclosed in Japanese Patent Laid-Open No. 2004-268399 does not take into account the details of the access with regard to the control for delaying execution of the process of shifting from the power-on state to the power-off state. For this reason, the communication apparatus disclosed in Japanese Patent Laid-Open No. 2004-268399 has a problem in that the power-on state is kept even if the communication apparatus may be shifted to the power-off state.

The communication apparatus disclosed in Japanese Patent Laid-Open No. 2015-3474 does not take into account the details of the access with regard to the process of shifting from the power-off state to the power-on state. For this reason, the communication apparatus disclosed in Japanese Patent Laid-Open No. 2015-3474 has a problem in that the communication apparatus shifts to the power-on state even if the power-off state may be kept.

SUMMARY OF THE INVENTION

The present invention provides a communication apparatus in which the process of shifting the state of the communication apparatus can be appropriately controlled.

A communication apparatus according to a first aspect of the present invention is capable of shifting to at least one of a first state and a second state in which less power is consumed than in the first state. The apparatus includes a receiving unit, a shifting unit, and a control unit. The receiving unit is configured to receive a request for data for display of a screen for remotely using the communication apparatus, from an external device capable of displaying the screen for remotely using the communication apparatus. The shifting unit is configured to execute a shifting process of shifting the communication apparatus to the second state when a condition for shifting the communication apparatus to the second state is satisfied. The control unit is configured to execute control for delaying execution of the shifting process when the communication apparatus is in the first state and when the receiving unit receives the request for data for the screen for remotely using the communication apparatus, from the external device. When the communication apparatus is in the first state and when the receiving unit receives a request, from the external device, for data for display of a predetermined screen that is among a plurality of screens for remotely using the communication apparatus from the external device, the control unit does not execute the control for delaying execution of the shifting process. When the communication apparatus is in the first state and when the receiving unit receives a request, from the external device, for data for display of a screen that is not the predetermined screen and that is among a plurality of screens for remotely using the communication apparatus, the control unit executes the control for delaying execution of the shifting process.

A communication apparatus according to a second aspect of the present invention is capable of shifting to at least one of a first state and a second state in which less power is consumed than in the first state. The apparatus includes a receiving unit and a shifting unit. The receiving unit is configured to receive a request for data for display of a screen for remotely using the communication apparatus, from an external device capable of displaying the screen for remotely using the communication apparatus. The shifting unit is configured to execute a shifting process of shifting the communication apparatus to the first state when the communication apparatus is in the second state and when the receiving unit receives the request for data for the screen for remotely using the communication apparatus from the external device. When the communication apparatus is in the second state and when the receiving unit receives a request, from the external device, for data for display of a predetermined screen that is among a plurality of screens for remotely using the communication apparatus from the external device, the shifting unit does not execute the shifting process. When the communication apparatus is in the second state and when the receiving unit receives a request, from the external device, for data for display of a screen that is not the predetermined screen and that is among a plurality of screens for remotely using the communication apparatus, the shifting unit executes the shifting process.

Further features of the present invention will become apparent from the following description of exemplary embodiments with reference to the attached drawings.

BRIEF DESCRIPTION OF THE DRAWINGS

FIG. 11 is a diagram illustrating an example of a screen for setting the communication apparatus according to the first embodiment.

FIG. 12 is a diagram illustrating an example of a screen showing the state of the communication apparatus according to the first embodiment.

DESCRIPTION OF THE EMBODIMENTS

Embodiments of the present invention will be described hereinbelow with reference to the drawings. It is to be understood that variations and modifications of the embodiments based on the general knowledge of those skilled in the art are also within the scope of the present invention without departing from the spirit of the invention.

First Embodiment

A communication apparatus according to a first embodiment of the present invention will be described. A communication apparatus to which the embodiment is applicable is an apparatus capable of providing a remote function to an external device. In this embodiment, examples of the communication apparatus include image processing apparatuses, PCs, mobile terminals, smartphones, tablet terminals, personal digital assistants (PDAs), digital cameras, television sets, and scanners. Examples of the image processing apparatuses include ink-jet printers, full-color laser beam printers, monochrome printers, copying machines, and facsimile machines. This embodiment uses an ink-jet multifunction printer (hereinafter abbreviated as MFP) capable of communicating with an external device as an example of the communication apparatus. This embodiment uses a PC as an example of the external device. The external device to which this embodiment is applicable is a device capable of communicating with the communication apparatus and capable of displaying a remote use screen, described later; for example, a mobile terminal, a smartphone, a tablet terminal, a PDA, a digital camera, and a television set.

Figure 1:
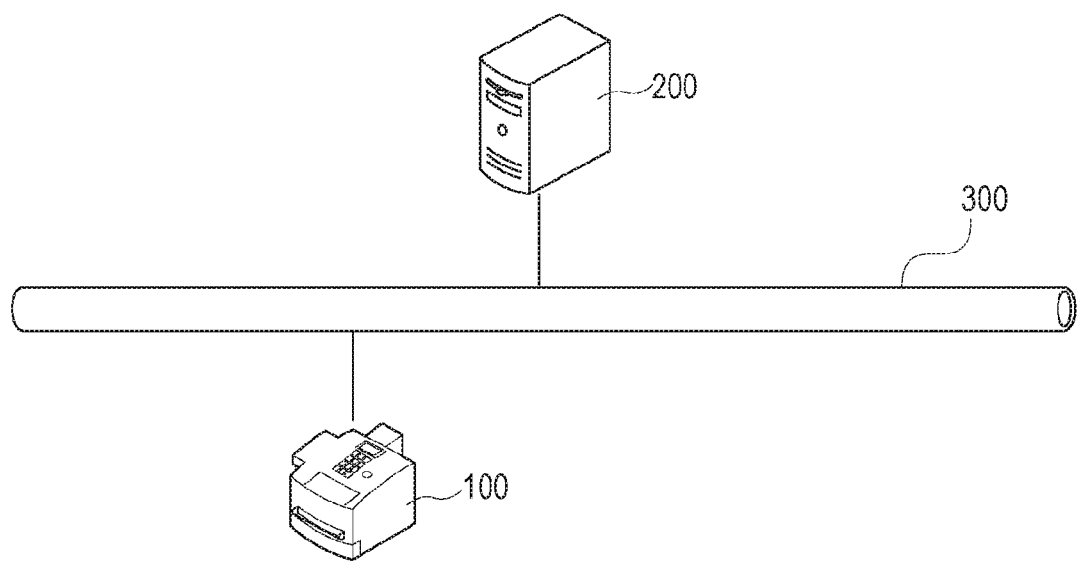
FIG. 1 is a block diagram illustrating an example of the configuration of an image processing system according to a first embodiment of the present invention.

FIG. 1 is a block diagram illustrating the general arrangement of an image processing system incorporating this embodiment. The image processing system incorporating this embodiment includes a MFP 100 and a PC 200 connected over a communication network 300, such as the Internet and an intranet. The MFP 100 is a communication apparatus incorporating this embodiment. The PC 200 is an external device incorporating this embodiment. This image processing system allows the PC 200 to implements a remote function that the MFP 100 provides. The remote function is a function of operating the MFP 100 and checking the state of the MFP 100 using the PC 200 distant from the MFP 100. In this embodiment, a remote use function is shown as an example of the remote function that the MFP 100 provides. Although the communication between the MFP 100 and the PC 200 is controlled using the Hypertext Transfer Protocol (HTTP), another known control protocol may be used.

Figure 2:
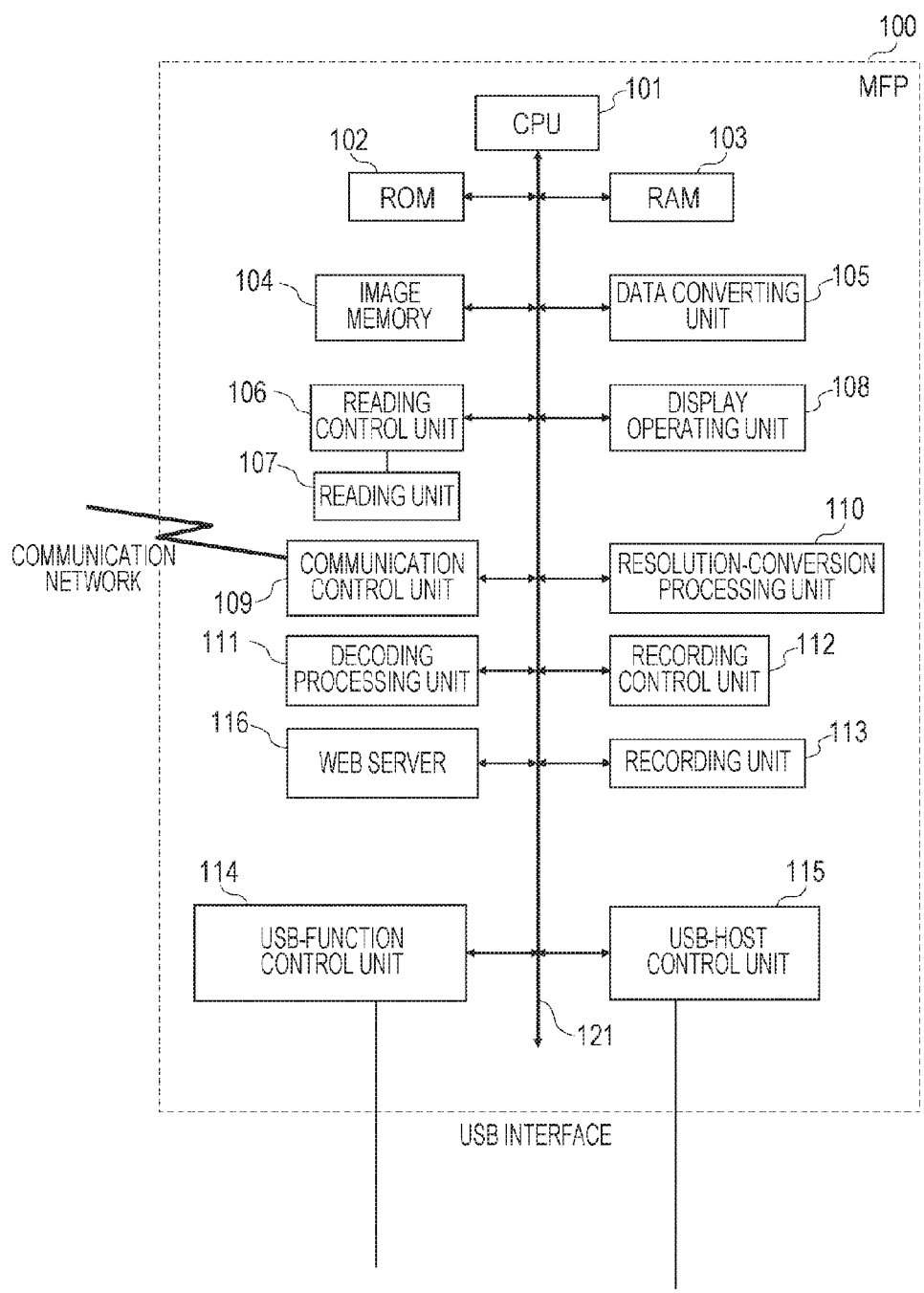
FIG. 2 is a functional block diagram illustrating, in outline, the configuration of a communication apparatus according to the first embodiment.

FIG. 2 is a block diagram illustrating, in outline, the configuration of the MFP 100. In the MFP 100, a central processing unit (CPU) 101 serves as a system control unit and controls the entire MFP 100.

A read-only memory (ROM) 102 stores fixed data, such as control programs that the CPU 101 executes, a data table, and a built-in operating system (hereinafter abbreviated as "OS") program. In this embodiment, the control programs stored in the ROM 102 are for controlling execution of software, such as scheduling, task switching, and interruption processing, under the control of the built-in OS stored in the ROM 102.

A random access memory (RAM) 103 is a static random access memory (SRAM) or the like that needs a backup power source and stores data using a backup primary cell (not shown). The RAM 103 stores program control variables etc. that should not be lost. The RAM 103 also has a memory area in which information on the settings of an automatic power-on function and an automatic power-off function and management data on the MFP 100. Examples of the settings on the automatic power-on function and the automatic power-off function include setting on whether the automatic power-on function and the automatic power-off function are enable or disable, setting on the set time for the automatic power-off function, and setting on level information on the automatic power-off function. These settings may be input by the user via a setting screen displayed on a display operating unit 108 or may be input on the PC 200 using a remote use function, described later. Alternatively, a user may be allowed to directly input a desired setting on the screen, or the user may be allowed to select one of a plurality of settings displayed in advance on the screen. Alternatively, a predetermined setting may be made at shipment. The RAM 103 can also store temporary program control variables whose data is not held with a data backup primary cell.

An image memory 104 is a dynamic random access memory (DRAM) or the like and stores image data. The image memory 104 allocates part of its area as a work area for executing software processing.

A data converting unit 105 analyzes a page description language (PDL) etc. and generates image data, such as expansion of character data to computer graphics (CG). The data converting unit 105 may decompress compressed image data received from the PC 200.

A reading unit 107 optically reads a document using a contact image sensor (CIS). A reading control unit 106 converts an image read by the reading unit 107 to electrical image data, performs various image processing operations, such as binary processing and halftone processing, with an image-processing control unit (not shown), and outputs high-definition image data. The reading control unit 106 and the reading unit 107 may adopt either of the following two control schemes. A first scheme is a sheet-reading control scheme for reading a document with a fixed contact image sensor while conveying the document. A second scheme is a book-reading control scheme for scanning a document fixed on a platen glass with a moving contact image sensor.

The display operating unit 108 includes numeral input keys, a mode setting key, a determination key, a cancellation key, and a power key, and a light-emitting diode (LED) or liquid crystal display (LCD). Starting of various functions of the MFP 100 and the various settings can be input through user operation on the display operating unit 108. The display operating unit 108 may include no LCD. As described above, setting of the automatic power-on function and the automatic power-off function may be input using the display operating unit 108.

A communication control unit 109 connects to the communication network 300 to connect to an Internet provider and to transfer data and image information to/from the PC 200. For the connection to the communication network 300, a known method, such as the HTTP, is used, and a description thereof will be omitted.

A resolution-conversion processing unit 110 performs resolution conversion control, such as mutual conversion between metric-series image data and inch-series image data and expansion/contraction processing. A decoding processing unit 111 performs decoding processing and expansion/contraction processing on image data (for example, uncompressed, MH, MR, MMR, JBIG, and JPEG image data) dealt in the MFP 100. A recording control unit 112 performs various image processing operations, such as smoothing, recording-density correction, and color correction, on image data to be printed via an image-processing control unit (not shown) to convert the image data to high-definition image data and outputs the converted image data to a printing unit 113. The printing unit 113 is an ink-jet printer and forms an image on a printing medium on the basis of color image data or monochrome image data generated by the recording control unit 112.

A universal-serial-bus (USB) function control unit 114 controls connection of a USB interface and performs protocol control based on a USB connection standard. Specifically, the USB-function control unit 114 converts data from a USB-function control task that the CPU 101 executes to packets and transmits the USB packets to the PC 200. Furthermore, the USB-function control unit 114 converts USB packets received from the PC 200 to data and transmits the data to the CPU 101. Furthermore, the USB-function control unit 114 detects that the MFP 100 is connected to the PC 200 via a USB. A USB-host control unit 115 is a control unit for establishing connection using a protocol determined by the USB connection standard. The USB connection standard is a standard for high-speed bidirectional data connection. Using the standard allows a plurality of hubs or functions (slaves) to be connected to a single host (a master). The USB-host control unit 115 has the function of a host in USB connection.

A WEB server unit 116 accepts a request for executing the remote function from the PC 200. When the WEB server unit 116 receives the request, the MFP 100 provides the remote function to the PC 200 via the communication control unit 109. In this embodiment, the MFP 100 can provide at least a remote use function as the remote function. The remote use function is a function of displaying a screen (a remote use screen) for setting the MFP 100 or monitoring the state of the MFP 100 on the display of the PC 200 so that the user can remotely set the MFP 100 or monitor the state of the MFP 100. Upon receiving a request for data for the display of the remote use screen from the PC 200, the MFP 100 transmits data that meets the request to the PC 200 as a response to the request.

The components 101 to 106 and the components 108 to 116 are mutually connected over a CPU bus 121 managed by the CPU 101.

Figure 3:
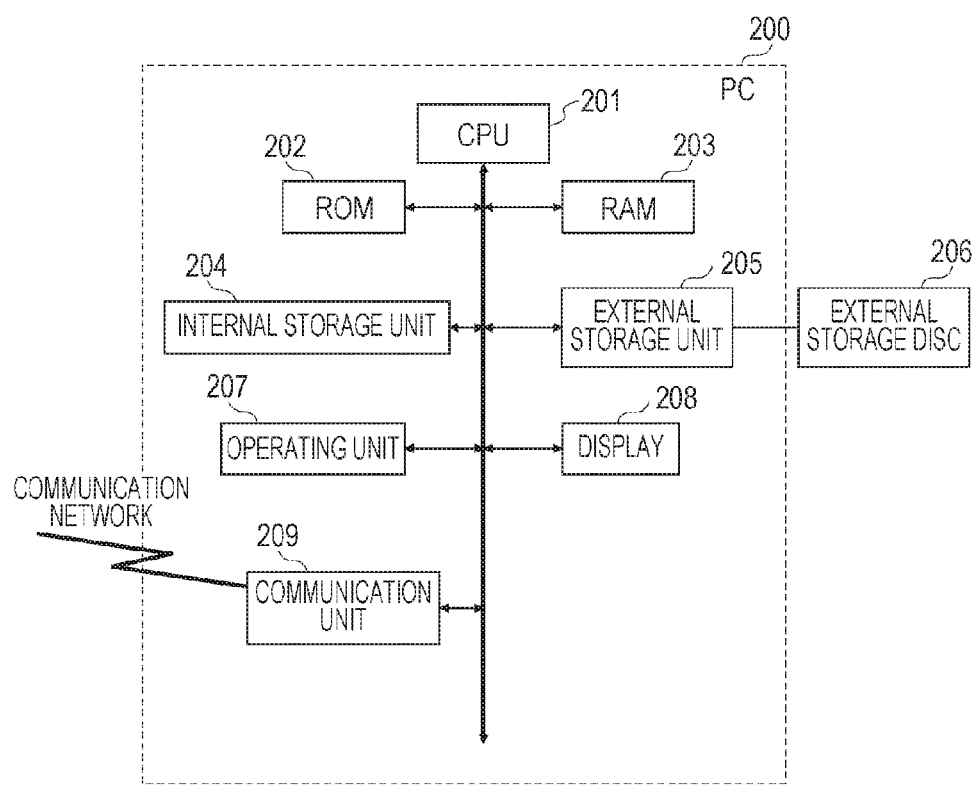
FIG. 3 is a functional block diagram illustrating, in outline, the configuration of an external device according to the first embodiment.

FIG. 3 is a block diagram illustrating, in outline, the configuration of the PC 200. A CPU 201 controls the operation of the entire PC 200 through a system bus according to programs read from a ROM 202, a RAM 203, an internal storage unit 204, or an external storage disc 206 using an external storage unit 205. The ROM 202 stores control programs for the CPU 201. The RAM 203 temporarily stores programs and image data to allow the PC 200 to operate at high speed. The RAM 203 is a SRAM or the like that needs a backup power source and stores data using a backup primary cell (not shown). The internal storage unit 204 stores an OS, various application programs, and image data. The internal storage unit 204 may have a browser, which is application software for using the remote function of the MFP 100. In this case, the PC 200 receives an input of a uniform resource locator (URL) containing the IP address of a communication apparatus (in this case, the MFP 100) that requests provision of a remote function from the user via the browser. Subsequently, the PC 200 accesses a WEB server (in this case, the WEB server unit 116) of the communication apparatus using the URL to acquire data for using the remote function, thereby executing the remote function. The remote function may be used via the browser or may be used via a remote function specific application installed in the PC 200.

The PC 200 has application software, a printer driver, and a scanner driver for using various functions that the MFP 100 can execute (for example, a printing function and a scanning function). The user can transmit jobs, such as a print job and a scan job, from the PC 200 to the MFP 100 by connecting a USB-host control unit (not shown) of the PC 200 and the USB-function control unit 114 together with a USB cable and using the above-described drivers. The method for transmitting the jobs using the USB cable is given for mere illustration; a method over a wireless LAN or a wired LAN may be used. The print job may contain a page description language. For example, the user may transmit jobs from the PC 200 to the MFP 100 by connecting the communication unit 209 and the communication control unit 109 together via the communication network 300. The application software, the printer driver, and the scanner driver are commonly installed in the PC 200 by being transferred from the external storage disc 206 (for example, a CD or DVD medium) that stores them via the external storage unit 205.

An operating unit 207 receives operations from the user via a keyboard or a mouse (not shown). A display 208 presents various displays to the user. In this embodiment, a screen displayed using the remote use function is displayed on the display 208. The communication unit 209 connects to an Internet provider and transmits and receives data to and from the MFP 100 by connecting to the communication network 300. In connecting to the communication network 300, a known method, for example, the HTTP and the Extensible Messaging and Presence Protocol (XMPP), is used, and a description thereof will be omitted.

Figures 8, 9:
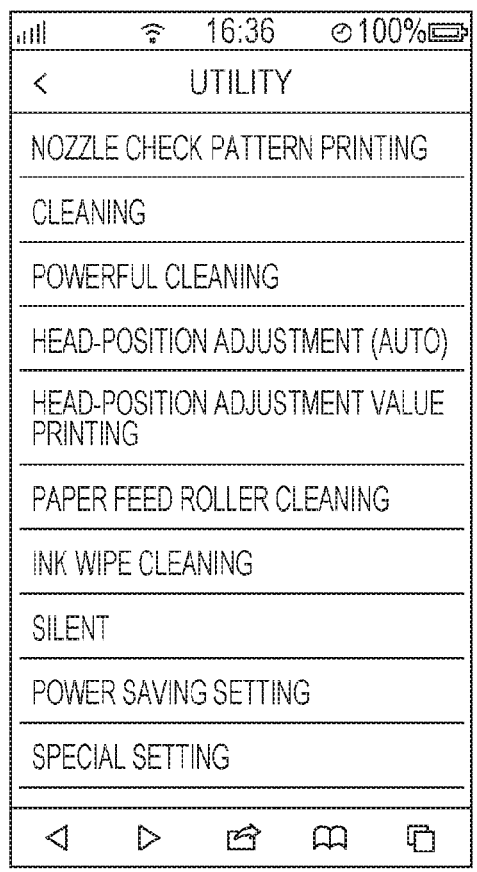
FIG. 8 is a diagram illustrating an example description of data for the display of a remote use screen according to the first embodiment.
FIG. 9 is a diagram illustrating an example of a screen for setting the communication apparatus according to the first embodiment.

The PC 200 can execute the remote function provided from the MFP 100 by issuing a request for executing the remote function to the WEB server unit 116 via the communication unit 209. In this embodiment, the PC 200 can execute at least the remote use function as the remote function. The PC 200 issues a request for data for the display of the remote use screen to the WEB server unit 116 and receives data for the display of the remote use screen, from the MFP 100 as a response to the request. The PC 200 executes the remote use function by displaying a screen based on the received data for the display 208. If the displayed remote use screen needs update, the PC 200 automatically repeats the request for data for the display of the remote use screen to the WEB server unit 116 at fixed intervals (hereinafter, this process is referred to as "reloading"). Thus, the PC 200 can update the display of the remote use screen by acquiring the data for the display of the remote use screen by reloading. Whether the remote use screen is automatically updated is determined according to whether the data for the display of the remote use screen contains a description of reloading. Data 801 in FIG. 8 is an example of description of data for the display of the remote use screen. The "meta" tag indicates additional information that is not supported by HEAD tag elements in the HTML and is used in combination of a property and its value. One example of the property is "http-equiv", and a value for the property is designated by setting the value on "content". In the data 801, "refresh" is set on "http-equiv". This indicates that the data 801 is data for the display of a remote use screen that is automatically updated. The element "content" indicates a set time for reloading. In the data 801, "10" is set on "content". This indicates that the data 801 is data for the display of a remote use screen that is reloaded every ten seconds. In this embodiment, if "refresh" is set on "http-equiv" in data for the display of the remote use screen, the CPU 201 determines that the data contains a description of reloading. If the data is about the display of a remote use screen that is not automatically updated, the data may not have the descriptions of "meta http-equiv" and "content", or different description is set on "meta http-equiv".

A method for describing the data for the display of the remote use screen is not limited to the method using the HTML; for example, other description method may be used or flags or the like may be used. The RAM 203 stores information on an elapsed time (T1) after the last reloading is performed or after the remote use screen is displayed. The elapsed time (T1), which is counted with a timer (not shown) provided in the PC 200, may be counted by a method of adding up elapsed times or a method of subtracting an elapsed time from the value of a set reloading time. The timer may count the number of vibrations of a pulse received from a pulse generator (not shown) that generates a pulse at a predetermined frequency and use, as the elapsed time (T1), a time according to the frequency of the pulse and the number of vibrations received. Reloading is executed, for example, when the PC 200 determines to perform reloading by comparing the elapsed time (T1) with a set time for reloading. The elapsed time (T1) is reset when reloading is executed, and the elapsed time (T1) is counted again from the reset time. The PC 200 can acquire the latest information on the MFP 100 to update the remote use screen by performing reloading.

Reloading is executed when a remote use screen showing data that can change with time, such as the amount of a printing agent, such as ink, the amount of a remaining printing medium, such as paper, the communication level, the radio field intensity, and the job progress of the MFP 100. The communication level is data displayed when the MFP 100 has a wireless LAN function. The communication level indicates the S/N ratio of the wireless LAN (the ratio of the level of a signal to the level of noise). The radio field intensity is data displayed when the MFP 100 has a wireless LAN function, as the communication level is, and indicates the intensity of the radio waves of the wireless LAN. Thus, the screen in which reloading is executed is a screen mainly shows the state of the MFP 100, for example, the screens shown in FIGS. 10 and 12. In contrast, a remote use screen in which reloading is not executed is a screen for setting the MFP 100, such as print setting, power saving setting, and security setting, for example, the screens shown in FIGS. 9 and 11.

The reloading allows the PC 200 to update a displayed remote use screen without the need for user operation to automatically reflect a change in the state of the MFP 100 to the displayed remote use screen. The remote use screen in which reloading is executed, that is, the screen which is automatically updated, is hereinafter referred to as a reloading target screen.

The automatic power-on function and the automatic power-off function will be described in detail. The automatic power-off function is a function for automatically shifting the state of the MFP 100 to the power-off state when the following conditions for resetting the count are not satisfied even if a predetermined time (set time for the automatic power-off function), which can be set by the method described using FIG. 2, has elapsed.

Examples of the set time for the automatic power-off function include 30 minutes, 60 minutes, and 120 minutes. The RAM 103 stores information on an elapsed time (T2) from the time when the conditions for resetting the count are satisfied or from the time when the MFP 100 shifts to the power-on state. The elapsed time (T2), which is counted with a timer (not shown) provided in the MFP 100, may be counted by a method of adding up elapsed times or a method of subtracting an elapsed time from the value of the set time for the automatic power-off function. The automatic power-off function is executed, for example, when the MFP 100 determines to shift to the power-off state by comparing the elapsed time (T2) and the set time for the automatic power-off function. The elapsed time (T2) is reset when conditions for resetting the count are satisfied, and the elapsed time (T2) is counted again from the reset time. The conditions for resetting the count are as follows. The first condition is that "the MFP 100 is accessed (Condition 1)". Specifically, "an operation on the MFP 100 main body is performed (Condition 1-1)", "a job is submitted from an external device, such as the PC 200 (Condition 1-2)", and "a request for data for the display of a remote use screen that is not a reloading target screen is issued (Condition 1-3)". An example of "an operation on the MFP 100 is performed (Condition 1-1)" is that an operation via the display operating unit 108 is executed by the user. An example of "a job is submitted from an external device, such as the PC 200 (Condition 1-2)" is that a print job or a scan job is submitted from the PC 200 via connection over a USB cable. The job may be submitted via wired connection or wireless connection. An example of "a request for data for the display of a remote use screen that is not a reloading target screen is issued (Condition 1-3)" is that a request for data for the display of a remote use screen is issued from the PC 200 to the WEB server unit 116 through user operation. Although, this embodiment uses a request for data for the display of a remote use screen that is not a reloading target screen as a condition for resetting the count, a request for data for the display of another predetermined remote use screen, not a reloading target screen, may be used as the condition. This allows the MFP 100 to control whether to keep the power-on state according to the kind of the request. The second condition is that "the MFP 100 is in an error state (Condition 2)". Examples of the error state include an out-of-ink error state in which an ink tank (not shown) of the MFP 100 runs out of ink and an out-of-paper error state in which a paper holder (not shown) of the MFP 100 runs out of paper. The error state is not limited to the above states and includes a conveying-unit paper-jam state, a paper-feeding-unit paper-jam state, a discharge-port closed state, a cover open state, a waste-ink-tank full state, a printing-unit high-temperature error state, and a power error state.

The fact that Condition 1 is satisfied indicates a situation in which the user is using the MFP 100, and the fact that Condition 2 is satisfied indicates a situation in which the state of the MFP 100 needs to be notified to the user. Therefore, the MFP 100 can delay the time to shift to the power-off state to keep the power-on state by resetting the elapsed time (T2) when the above conditions are satisfied.

The automatic power-on function is a function for automatically shifting the state of the MFP 100 to the power-on state when the MFP 100 in the power-off state satisfies conditions for shifting to the power-on state. The conditions for shifting to the power-on state are the same as the conditions for resetting the count (Conditions 1-2 and 1-3) other than Condition 1-1 and Condition 2, and descriptions thereof will be omitted. The configuration in which the MFP 100 shifts to the power-on state when the above conditions are satisfied allows the MFP 100 to shift to the power-on state in a situation in which the user is using the MFP 100 or a situation in which the state of the MFP 100 has to be notified to the user.

Next, the power-on state and the power-off state will be described in detail.

The power-on state is a state in which the power supply (not shown) for the MFP 100 is on, so that the components of the MFP 100, such as the CPU 101, the display operating unit 108, and the communication control unit 109, are supplied with electric power. The MFP 100 in the power-on state can execute the functions of the MFP 100, such as printing, scanning, and transmitting information on the remote use screen.

The power-off state is a state in which power is less consumed than that in the power-on state. The power-off state is not limited to a state in which power supply to the components of the MFP 100 is completely stopped; it may be a power saving state, a sleep state, or a soft power-off state. Specifically, the power-off state may be, for example, a state in which only a component that controls the entire MFP 100, such as the CPU 101, or components that communicate with another information processing unit, such as the communication control unit 109 and the WEB server unit 116, are supplied with electric power, and the other components are supplied no electric power. In the power-off state of this embodiment, power supply to at least the display operating unit 108 is stopped. Thus, the power-off state may not be a state in which electric power is not supplied at all in a strict sense. The MFP 100 in which the automatic power-on function is set needs to detect whether the conditions for shifting to the power-on state are satisfied. This requires that power supply to the communication control unit 109 and the WEB server unit 116 is kept also in the power-off state. This is not needed if the automatic power-on function is not set. For this reason, the MFP 100 in which the automatic power-on function is not set can be shifted to a power-off state in which power is less consumed than in a case in which the automatic power-on function is set. Thus, the MFP 100 may control the degree of power supply in the power-off state according to the setting on the MFP 100.

Figure 4:
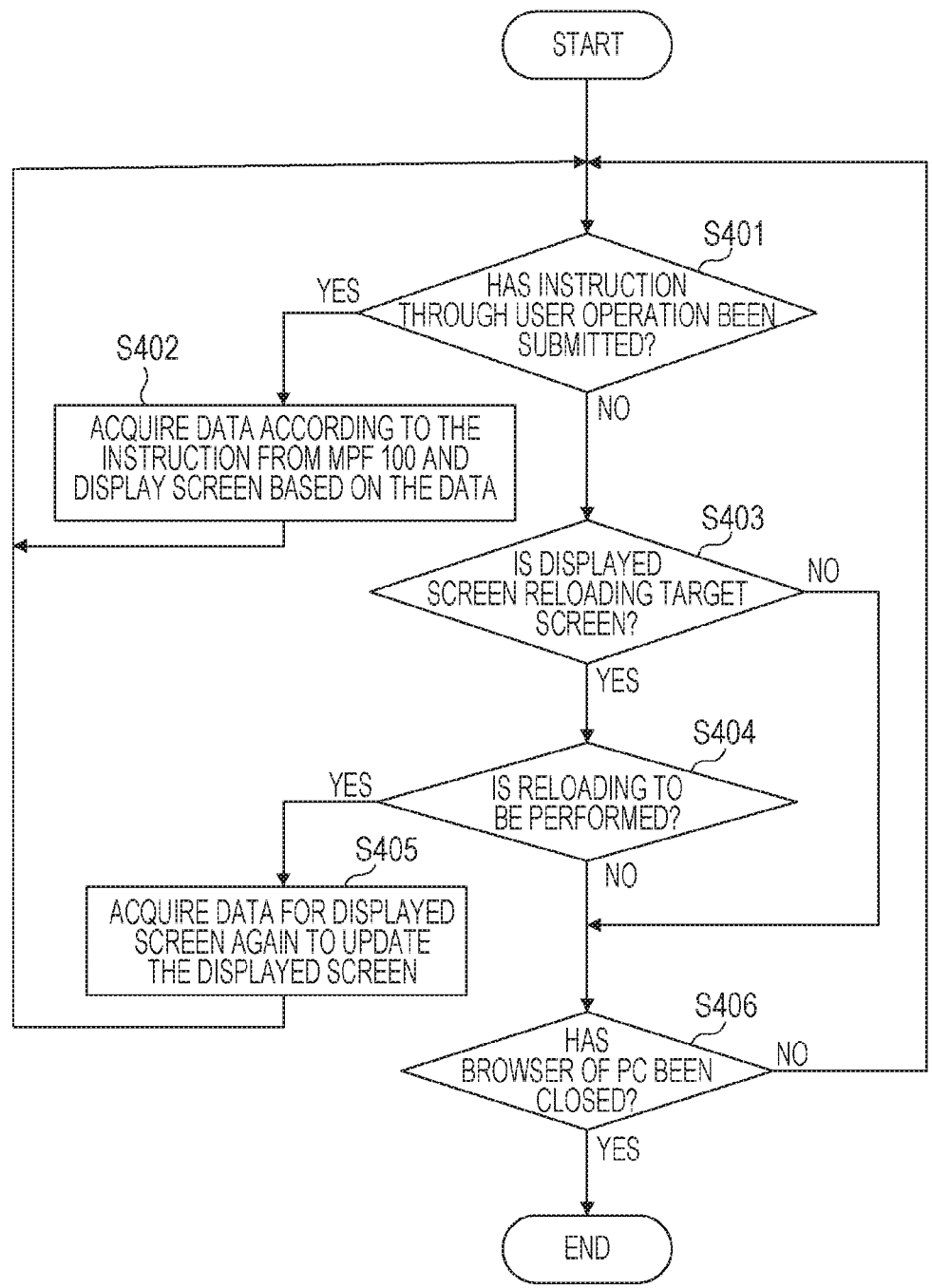
FIG. 4 is a flowchart illustrating a process executed by the external device according to the first embodiment.

FIG. 4 is a flowchart illustrating a process executed by the PC 200 in this embodiment. The process illustrated in the flowchart is implemented by the CPU 201 loading a control program stored in a hard disk drive (HDD) (not shown) of the ROM 202 or the PC 200 onto the RAM 203 and executing the control program. The process illustrated in the flowchart is implemented by the CPU 201 in a state in which the CPU 201 requests data for the display of the remote use screen from the WEB server unit 116 and displays a screen based on the data for the display 208.

Figure 10:
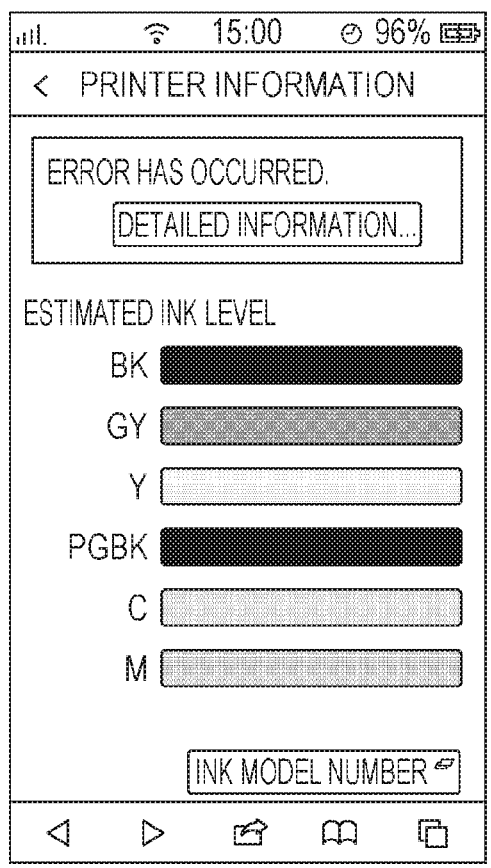
FIG. 10 is a diagram illustrating an example of a screen showing the state of the communication apparatus according to the first embodiment.

First, at S401, the CPU 201 determines whether an instruction to switch or update the display of the remote use screen has been issued through user operation. This determination is performed by, for example, determining whether a user input has been given to a browser that displays the remote use screen. If the CPU 201 determines that an instruction through user operation has been given, then at S402 the CPU 201 request the WEB server unit 116 to transmit data for the display of the remote use screen based on the instruction and receives data based on the request from the MFP 100. The CPU 201 uses the received data to display a screen based on the data for the display 208, as illustrated in FIGS. 9 to 12. FIGS. 9 and 11 illustrate display examples of a remote use screen that is not a reloading target screen. FIGS. 10 and 12 are display examples of a reloading target screen.

A process performed by the MFP 100 at that time will be described later with reference to FIG. 5. Thereafter, the CPU 201 performs the process at S401 again.

If at S401 the CPU 201 determines that an instruction through user operation is not given, then at S403 the CPU 201 determines whether the screen displayed on the display 208 is a reloading target screen. This determination is performed, for example, by determining whether data for the screen displayed on the display 208 contains a description of reloading. If the CPU 201 determines that the screen is not a reloading target screen, then the CPU 201 performs the process at S406. If the CPU 201 determines that the screen is a reloading target screen, then the CPU 201 performs the process at S404.

At S404, the CPU 201 determines whether to perform reloading. This determination is performed, for example, by comparing the reloading set time in the data for the remote use screen displayed on the display 208 with the elapsed time (T1). For the determination, the CPU 201 checks a reloading set time based on a value described in "content" in the data in FIG. 8 and information on the elapsed time (T1) stored in the RAM 203. Assume that a method for counting the elapsed time (T1) is an addition method. If the elapsed time (T1) exceeds a set time for the automatic power-off function, the CPU 201 determines to execute reloading, and if the elapsed time (T1) does not exceed the set time, the CPU 201 determines not to execute reloading. Assume that a method for counting the elapsed time (T1) is a subtraction method. If the elapsed time (T1) is 0, the CPU 201 determines to execute reloading, and if the elapsed time (T1) is not 0, the CPU 201 determines not to execute reloading. If the CPU 201 determines to execute reloading, the CPU 201 performs the process at S405, and if the CPU 201 determines not to execute reloading, the CPU 201 executes the process at S406.

At S405, the CPU 201 executes reloading to receive data for the display of the remote use screen displayed on the display 208. Then, the CPU 201 updates the remote use screen displayed on the display 208. A process performed by the MFP 100 at that time will be described later with reference to FIG. 5. Thereafter, the CPU 201 performs the process at S401 again.

At S406, the CPU 201 determines whether the browser has been closed by the user. If the CPU 201 determines that the browse has not been closed, the CPU 201 performs the process at S401 again, and if the CPU 201 determines that the browser has been closed, the CPU 201 terminates the process.

Figure 5:
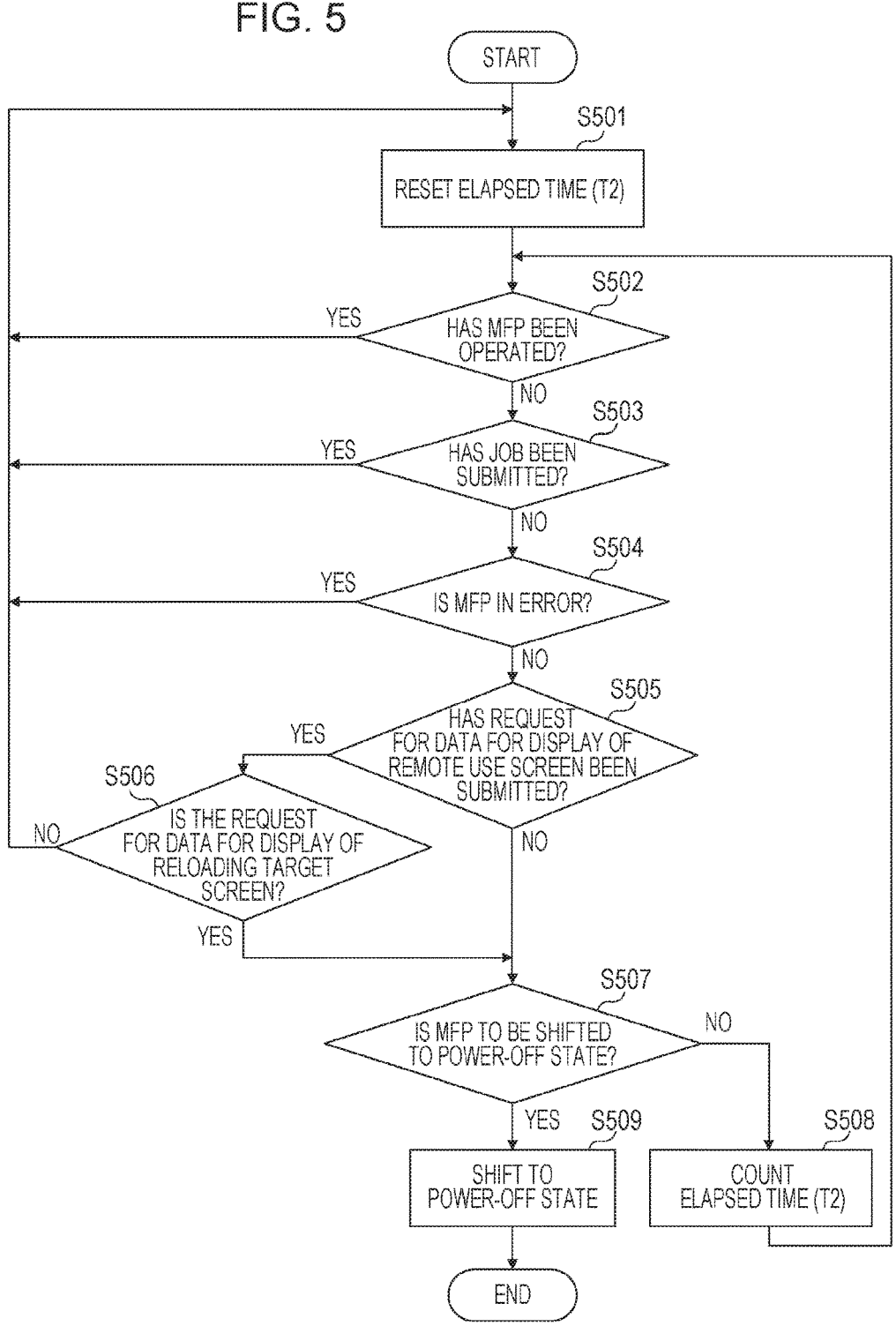
FIG. 5 is a flowchart illustrating a process performed by the communication apparatus according to the first embodiment.

FIG. 5 is a flowchart illustrating a process that the MFP 100 incorporating this embodiment executes. The process illustrated in the flowchart is implemented by the CPU 101 loading a control program stored in the HDD (not shown) of the ROM 102 or the MFP 100 onto the RAM 103 and executing the control program. The process illustrated in the flowchart is executed by the CPU 101 when the automatic power-off function of the MFP 100 is set enabled and the MFP 100 is in the power-on state.

At S501, the CPU 101 resets the elapsed time (T2) stored in the RAM 103. Resetting the elapsed time (T2) allows the CPU 101 to reset the time until the automatic power-off function is executed.

Subsequently at S502, the CPU 101 determines whether an operation on the MFP 100 main body (Condition 1-1) has been performed. If it is determined that an operation has been performed, the CPU 101 should not execute the automatic power-off function because a process corresponding to the operation has to be executed. Therefore, if the CPU 101 determines that an operation has been performed, the CPU 101 performs the process at S501 to reset the elapsed time (T2). In contrast, if the CPU 101 determines that no operation has been performed, the CPU 101 performs the process at S503.

At S503, the CPU 101 determines whether a job from another information processing apparatus, such as the PC 200, has been submitted (Condition 1-2). If the CPU 101 determines that a job has been submitted, the CPU 101 should not execute the automatic power-off function because the job has to be processed. Therefore, if the CPU 101 determines that a job has been submitted, the CPU 101 performs the process at S501 to reset the elapsed time (T2). In contrast, if it is determined that no job has been submitted, the CPU 101 performs the process at S504.

At S504, the CPU 101 determines whether the MFP 100 is in an error state (Condition 2). If the CPU 101 determines that the MFP 100 is in an error state, the CPU 101 should not execute the automatic power-off function to notify the user of the error state. Therefore if the CPU 101 determines that the MFP 100 is in an error state, the CPU 101 performs the process at S501 to reset the elapsed time (T2). In contrast, if the CPU 101 determines that the MFP 100 is not in an error state, the CPU 101 performs the process at S505.

At S505, the CPU 101 determines whether a request for data for the display of a remote use screen has been issued from the PC 200. If the CPU 101 determines that a request has been issued, then CPU 101 performs the process at S506. If the CPU 101 determines that no request has been given, the CPU 101 performs the process at S507.

At S506, the CPU 101 determines whether the request for data for the display of a remote use screen is a request for data for the display of a reloading target screen to determine whether Condition 1-3 is satisfied. The request for data for the display of a reloading target screen can have been issued by reloading. Reloading is a process executed at above-described S403 and is not executed according to user instruction. Therefore, the request for data for the display of a reloading target screen can have been submitted although the user leaves the PC 200 unused. For this reason, in this embodiment, if at S506 the CPU 101 determines that the request is a request for data for the display of a reloading target screen, the CPU 101 does not reset the elapsed time (T2) and performs the process at S507. With this configuration, the MFP 100 can be shifted to the power-off state also when the MFP 100 is accessed even if the user is not using the PC 200. A request for data for the display of a remote use screen that is not a reloading target screen (Condition 1-3) is the request issued by the process of above-described S402, which is issued by the user operating the PC 200. Therefore, if the MFP 100 receives the request, the MFP 100 is likely to continue to be used by the user, so that the MFP 100 should not shift to the power-off state. Therefore, if at S506 the CPU 101 determines that the request is not a request for data for the display of a reloading target screen, the CPU 101 performs the process at S501 to reset the elapsed time (T2). For example, if "refresh" is set on "http-equiv" in the description in data transmitted in response to the request, the CPU 101 determines at S506 that the request is a request for data for the display of a reloading target screen. Otherwise, the CPU 101 determines that the request is not a request for data for the display of a reloading target screen. The method of determination at S506 is not limited to the method of referring to the description of reloading in the data; another method may be used, for example, a method of comparing the requested data with a table in which information on whether the screen is a reloading target screen is set for each data.

Conditions for the determination of whether the request is a request for data for the display of a reloading target screen may include level information on the automatic power-off function. For example, level information on a reloading target screen containing information on a job processing, such as the amount of remaining ink, the amount of remaining paper, and the job progress of the MFP 100, is set to 1. Level information on a reloading target screen containing information related to communication, such as the communication level and the radio field intensity of the MFP 100, is set to 2. Furthermore, the user sets level information on the automatic power-off function for the MFP 100 using the method of setting the automatic power-off function, described above. If the level information on the automatic power-off function set by the user is 1, then the CPU 101 determines only a request for data for the display of a reloading target screen with level information of 1 as a request for data for the display of a reloading target screen. Furthermore, the CPU 101 determines that a request for data for the display of a reloading target screen with level information of 2 or greater is not a request for data for the display of a reloading target screen. If level information on an automatic power-off function set by the user is 2, then the CPU 101 determines that a request for data for the display of a reloading target screen with level information of 1 or 2 is a request for data on the display of a reloading target screen. Furthermore, the CPU 101 determines that a request for data for the display of a reloading target screen with level information of 3 or greater is not a request for data for the display of a reloading target screen. Thus, adding the level information on the automatic power-off function to the conditions for the determination at S506 allows such a control that uniform determination is not made on a request for data for the display of a reloading target screen. For the setting of level information, greater values may be set, or not values but flags may be set. As an alternative, it may be determined that a request for data for the display of a reloading target screen equal to or lower than level information on the automatic power-off function set by the user is not a request for data for the display of a reloading target screen.

Subsequently at S507, the CPU 101 determines whether to shift the state of the MFP 100 to the power-off state. Assume that a method for counting the elapsed time (T2) is an addition method. If the elapsed time (T2) exceeds a set time for the automatic power-off function, the CPU 101 determines to shift the MFP 100 to the power-off state; otherwise, the CPU 101 determines not to shift the MFP 100 to the power-off state. Assume that a method for counting the elapsed time (T2) is a subtraction method. If the elapsed time (T2) is 0, the CPU 101 determines to shift the MFP 100 to the power-off state; otherwise, the CPU 101 determines not to shift the MFP 100 to the power-off state. If the CPU 101 determines to shift the MFP 100 to the power-off state, the CPU 101 shifts the state of the MFP 100 from the power-on state to the power-off state. If the CPU 101 determines not to shift the MFP 100 to the power-off state, then at S508 the CPU 101 counts the elapsed time (T2) at the present time using the timer (not shown) of the MFP 100. After the counting, the CPU 101 returns to the process at S502 to again perform the determination for resetting the elapsed time (T2).

As described above, even if a request is given in a state in which a reloading target screen is displayed on the PC 200, the CPU 101 of this embodiment does not reset the elapsed time (T2). This control allows the MFP 100 to shift to the power-off state even if the PC 200 is left unused, with the reloading target screen displayed, thus reducing power consumption.

The CPU 101 of this embodiment executes the same control that the elapsed time is not uniformly reset regardless of whether the request for data for the display of a reloading target screen is given through user operation. This provides the advantageous effects of the present invention without exerting a large load for processing on the MFP 100.
Second Embodiment In the first embodiment, an information processing apparatus has been described in which, even if a request for data for the display of a reloading target screen is given, an automatic power-off function can be executed without resetting the elapsed time (T2). In the first embodiment, when a request for data for the display of a reloading target screen is issued, the same control that the elapsed time is not uniformly reset is performed regardless of whether the request is given through user operation, thereby reducing the processing load on the MFP 100. However, whether the request is given through user operation is not taken into consideration. In this embodiment, "a request through user operation is given" (Condition 1-4) is added as conditions for resetting the count, and an information processing apparatus that makes a determination for resetting the elapsed time (T2) will be described.

This embodiment uses the same image processing system as in the first embodiment, and a description of the same configuration as that of the first embodiment will be omitted.

Figure 6:
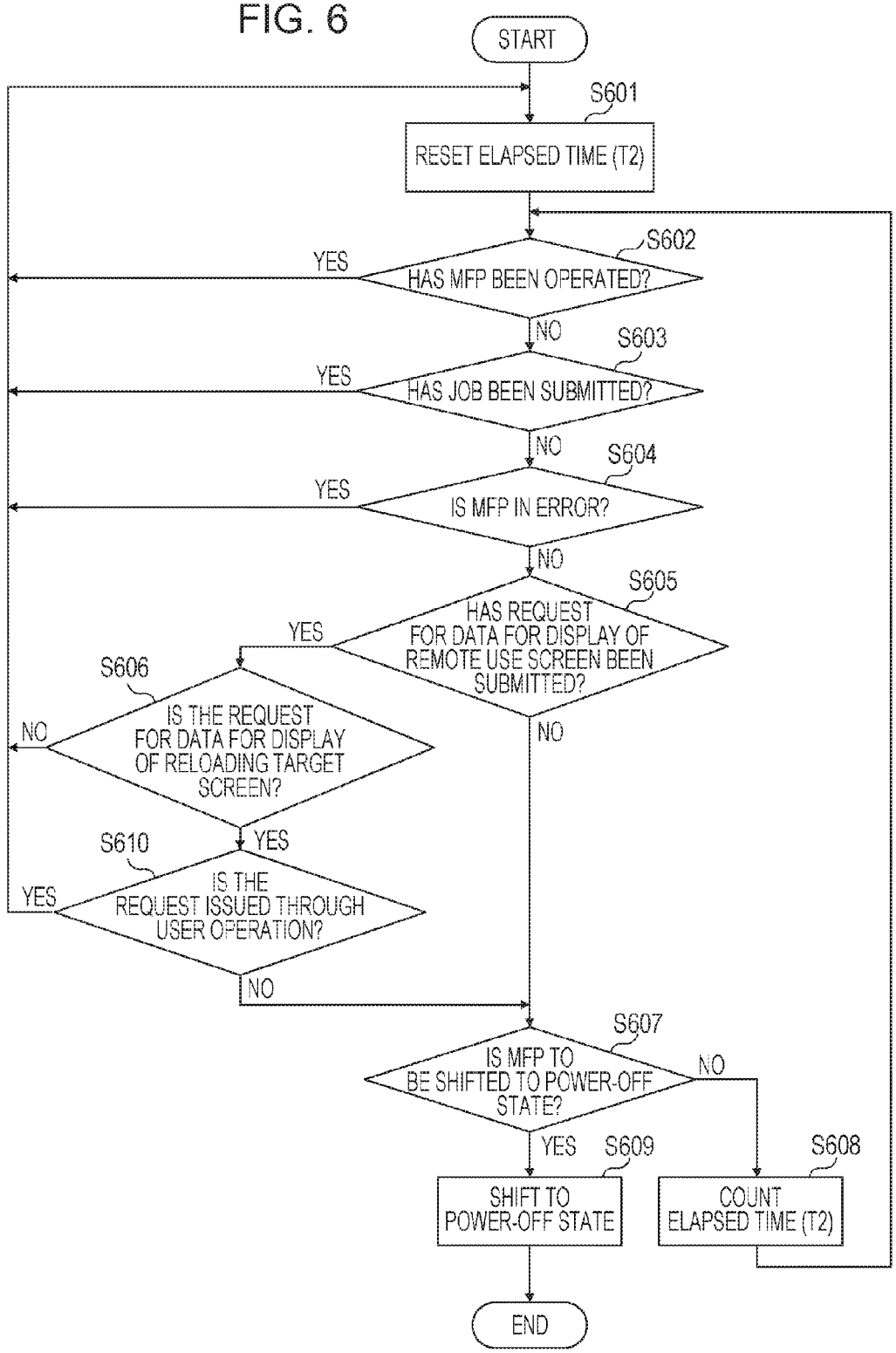
FIG. 6 is a flowchart illustrating a process performed by a communication apparatus according to a second embodiment of the present invention.

FIG. 6 is a flowchart illustrating a process executed by the MFP 100 in this embodiment. The process illustrated in the flowchart is implemented by the CPU 101 loading a control program stored in the HDD (not shown) of the ROM 102 or the MFP 100 onto the RAM 103 and executing the control program. The process illustrated in the flowchart is executed by the CPU 101 when the automatic power-off function of the MFP 100 is set enabled and the MFP 100 is in the power-on state.

The processes from S601 to S605 and the processes from S607 to S609 are the same as the processes from S501 to S505 and the processes from S507 to S509, and descriptions thereof will be omitted.

At S606, the CPU 101 determines whether the request for data for the display of a remote use screen is a request for data for the display of a reloading target screen to determine whether Condition 1-3 is satisfied. A specific method of determination is the same as that at S506, and a description thereof will be omitted. If the CPU 101 determines that the request is not a request for data for the display of a reloading target screen, the CPU 101 performs the process at S601 to reset the elapsed time (T2), as in the first embodiment. In contrast, if the CPU 101 determines that the request is a request for data for the display of a reloading target screen, the CPU 101 performs the process at S610.

At S610, the CPU 101 determines whether the request for data for the display of a reloading target screen is a request issued through user operation (Condition 1-4). In any reloading target screen, the first shift to the reloading target screen is not automatically executed by the CPU 101 but is executed through user operation. The first shift to the reloading target screen includes a shift from a remote use screen other than a reloading target screen to the reloading target screen and a shift from a reloading target screen to another reloading target screen. Therefore, if the request for data for the display of a reloading target screen is the first request for the data, it is certain that the request has not been issued by reloading but through user operation, and the MFP 100 should not shift to the power-off state. For this reason, at the determination at S610, the CPU 101 of this embodiment determines whether the request is the first request for data for the display of a reloading target screen. If the CPU 101 determines that the request is the first request for data for the display of a reloading target screen, then the CPU 101 determines at S610 that the answer is Yes and performs the process at S601 to reset the elapsed time (T2). Specific examples of conceivable methods for determining whether the request is the first request for data for the display of a reloading target screen are as follows. A first method is a method of counting the number of requests for data after the MFP 100 goes into the power-on state to determine whether the request for the data has already been issued. In this case, a flag may be set to the target data for each request, and the determination of whether the request for the data has already been issued. A second method is a method of determining whether the details of the previous request and the details of this request differ from each other. This is because reloading is executed to update the remote use screen, so that a request for the same data is continuously issued. Therefore, the fact that a request for data different from that of the previous request has been issued indicates that the request is not issued by reloading. A third method is a method of determining whether the elapsed time after the previous request is issued until a new request is received differs from a set time for reloading a reloading target screen displayed in response to the new request. This is because reloading is executed every set time, so that the fact that the elapsed time after the previous request is issued until a new request is received differs from a set time indicates that the new request is not issued reloading. Which of the above determination methods is used at S610 may be set freely by the user or may be determined in advance before shipment. Another method other than the above methods may be used to determine whether the request is a request through user operation.

The second and subsequent requests can be issued by reloading. For this reason, if the CPU 101 determines that the request is not the first request for data for the display of a reloading target screen, the CPU 101 determines at S610 that the answer is No and performs the process at S607 without resetting the elapsed time (T2).

Thus, in this embodiment, even though a request for data for the display of a reloading target screen is issued to the MFP 100, the elapsed time (T2) is not reset if the request is the first request. This configuration prevents the MFP 100 from entering the power-off state although a request for data for the display of a reloading target screen is issued under the situation in which the user is using the remote use function.
Third Embodiment In the above embodiments, the process performed by the MFP 100 when reloading is executed in the power-on state is described. Applying the above embodiments allows the MFP 100 to shift to the power-off state even in a state in which the PC 200 is left unused, with the reloading target screen displayed. However, the above embodiments do not take into consideration control after the MFP 100 shifts to the power-off state. Upon receiving a request in the power-off state, conventional communication apparatuses return to the power-on state. For this reason, applying the related art to the above embodiments will cause the MFP 100 to return to the power-on state when reloading is continued in the power-off state. Thus, in the third embodiment for solving the problem, an information processing apparatus will be described that does not enter the power-on state when a request for data for the display of a reloading target screen is issued in the power-off state. The third embodiment may be combined with the above embodiments.

This embodiment uses the same image processing system as that of the above embodiments, and a description thereof will be omitted.

Figure 7:
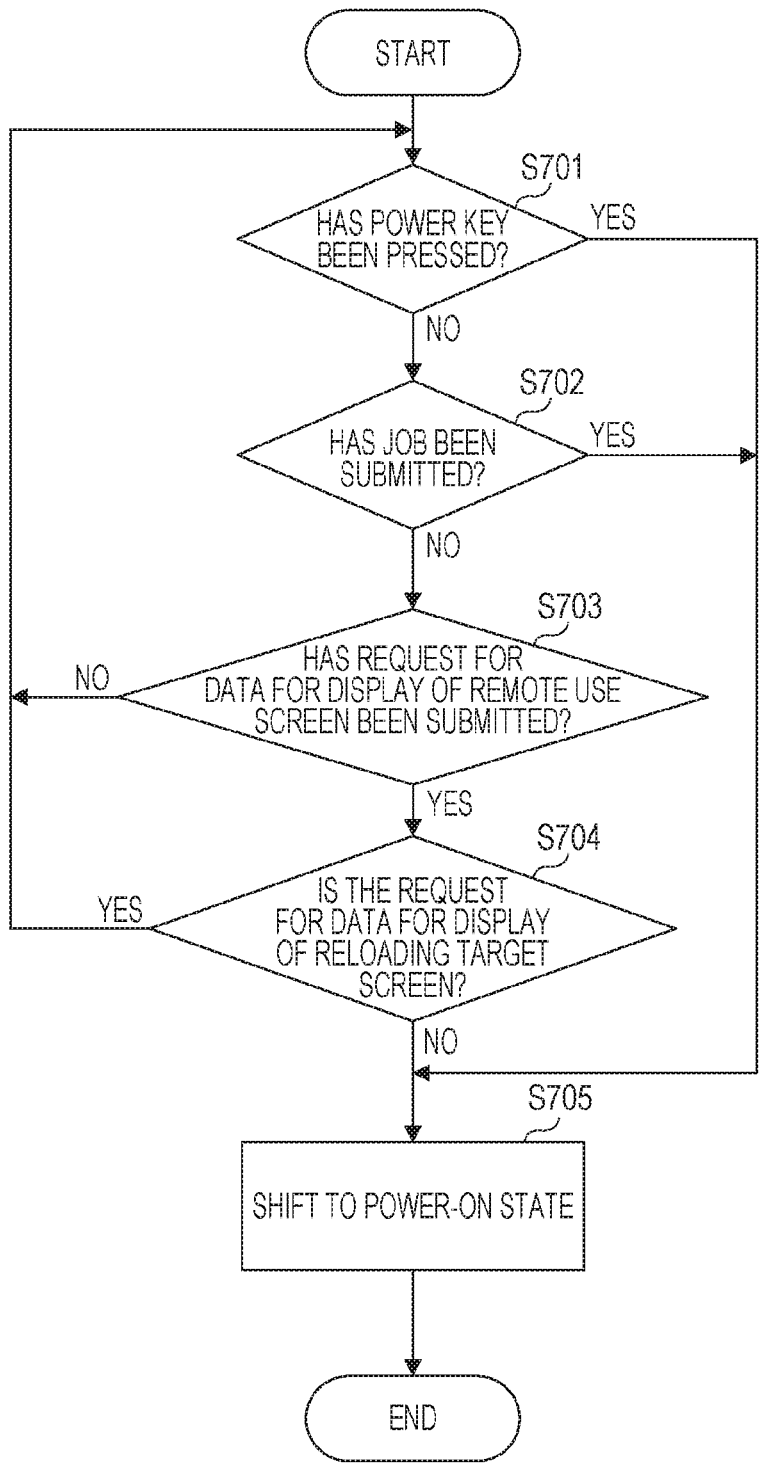
FIG. 7 is a flowchart illustrating a process performed by a communication apparatus according to a third embodiment of the present invention.

FIG. 7 is a flowchart illustrating a process performed by the MFP 100 in this embodiment. The process illustrated in the flowchart is implemented by the CPU 101 loading a control program for the flowchart stored in the HDD (not shown) of the ROM 102 or the MFP 100 onto the RAM 103 and executing the control program. The process illustrated in the flowchart is executed by the CPU 101 when the automatic power-on function of the MFP 100 is set enabled and the MFP 100 is in the power-off state. The MFP 100 is brought into the power-off state when an AC power supply (not shown) is detached, the power key of the display operating unit 108 is pressed, or the automatic power-off function is executed.

At S701, the CPU 101 determines whether the power key of the display operating unit 108 has been pressed. If the CPU 101 determines that the power key has been pressed, the CPU 101 performs the process at S705 to shift the state of the MFP 100 to the power-on state. In contrast, if the CPU 101 determines that the power key has not been pressed, then the CPU 101 performs the process at S702.

At S702, the CPU 101 determines whether a job is submitted from another information processing apparatus, such as the PC 200 (Condition 1-2). If the CPU 101 determines that the job has been submitted, the CPU 101 should not keep the power-off state because the job needs to be processed. Therefore, if the CPU 101 determines that a job has been submitted, the CPU 101 performs the process at S705 to shift the state of the MFP 100 to the power-on state. In contrast, if the CPU 101 determines that no job has been transmitted, the CPU 101 performs the process at S703.

At S703, the CPU 101 determines whether a request for data for the display of a remote use screen has been submitted from the PC 200. If the CPU 101 determines that a request has been issued, the CPU 101 performs the process at S704. If the CPU 101 determines that no request has been given, the CPU 101 returns to the process at S701 to determine again whether to shift the state of the MFP 100 to the power-on state.

At S704, the CPU 101 determines whether the request for data for the display of a remote use screen is a request for data for the display of a reloading target screen to determine whether Condition 1-3 is satisfied. As described above, the request for data for the display of a reloading target screen can be a request issued to the MFP 100 although the user leaves the PC 200 unused. Therefore, in this embodiment, if the CPU 101 determines that the request is a request for data for the display of a reloading target screen, the CPU 101 does not shift the state of the MFP 100 to the power-on state and returns to the process at S701. A request for data for the display of a request for data for the display of a remote use screen, not of a reloading target screen, is a request issued by the user operating the PC 200, as described above. Therefore, if the CPU 101 determines that the request is not a request for data for the display of a reloading target screen, the CPU 101 performs the process at S705 to shift the state of the MFP 100 to the power-on state to provide a remote use function to the PC 200. The determination of whether the request is a request for data for the display of a reloading target screen is executed as in the above embodiments. Conditions for determining whether the request is a request for data for the display of a reloading target screen may further include the level information on the automatic power-off function, as in the above embodiments.

As described above, the CPU 101 in this embodiment does not shift the MFP 100 to the power-on state even if reloading is executed by the PC 200. This control allows, even if the MFP 100 is given a request although the user is not using the PC 200, the MFP 100 to keep the power-off state without shifting to the power-on state, thus reducing the power consumption.

Furthermore, in this embodiment, after the process at S704, the CPU 101 may determine whether the request for data for the display of a reloading target screen is the first request for data for the display of a reloading target screen (Condition 1-4). Such a configuration allows the CPU 101 to shift the state of the MFP 100 to the power-on state when a request for data for the display of a reloading target screen is issued through user instruction.

Other Embodiments

In the above embodiments, although Conditions 1-1 to 1-3 and Condition 2 are given as examples of conditions for resetting the count and shifting the MFP 100 to the power-on state, the conditions are not limited to the above. In some embodiments, various conditions may be added. Other example conditions include that "the MFP 100 connects using PictBridge" (Condition 3) and that "writing to a memory card placed in the MFP 100 is enabled" (Condition 4). PictBridge is a standard for communicating with information processing apparatuses, such as image processing apparatuses and digital cameras, via a USB or infrared rays for printing. Thus, in the determination under Condition 3, the CPU 101 determines whether the USB-function control unit 114 or an infrared control unit (not shown) connects to another information processing apparatus using PictBridge. The memory card is a device for storing information, such as an SD card and a CompactFlash®. The memory card includes write-enabled setting and write-disabled setting. If a memory card at write-enabled setting is placed in a card reader (not shown), the MFP 100 can write information to the memory card. In the determination under Condition 4, for example, the CPU 101 determines whether a memory card that the card reader (not shown) detects is at write-enabled setting.

To provide the advantageous effect of the present invention, the above embodiments have a configuration in which a request for data for the display of a predetermined screen (for example, a reloading target screen) is submitted, the time to shift to the power-off state is not delayed (elapsed time (T2) is not reset). However, the configuration for providing the advantageous effect of the present invention is not intended to limit the present invention. The CPU 101 can provide the advantageous effect of the present invention with a configuration in which, when a request for data for the display of a remote use screen is issued, the CPU 101 inquires what screen is displayed from the PC 200, and if the result of inquiry shows that the PC 200 displays a predetermined screen (for example, a reloading target screen), the CPU 101 does not reset the count. Such a configuration provides the advantageous effect of the present invention without considering what screen the request is for. This also applies to the configuration described in the third embodiment in which the MFP 100 is not shifted to the power-on state when a request for data for the display of a predetermined screen (for example, the reloading target screen) is issued.

The sequence of the processes in the flowcharts of the above embodiments may be changed, or the details of the processes may be changed provided that the advantageous effect can be produced. For example, the sequence of the processes may be change so that, if it is determined at S507 that the set time for the power-off function has been elapsed, the determinations at S502 to S506 are made. In another example, the processes from S502 to S504 may be omitted, and only the determinations at S505 and S506 may be made to determine whether to reset the elapsed time (T2).

The above embodiments can also be achieved by supplying programs for performing one or more functions of the above embodiments to a system or apparatus via a network or a storage medium and by implementing the programs with one or more processors of the system or apparatus. The above embodiments can also be achieved with a circuit for performing one or more functions, for example, an application-specific integrated circuit (ASIC)).

The embodiments of the present invention allow the process of shifting the state of a communication apparatus to be appropriately controlled.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102291, filed May 19, 2015, which is hereby incorporated by reference herein in its entirety.

What is claimed is:

1. A communication apparatus capable of shifting to at least one of a first state and a second state in which less power is consumed than in the first state, the apparatus comprising:
    at least one processor configured to:
    receive a transmission request for data for display of a screen for remotely using the communication apparatus, from an external device capable of displaying the screen for remotely using the communication apparatus, wherein the screen for remotely using the communication apparatus includes a first screen and a second screen;
    transmit, to the external device, data for display of a screen according to the transmission request, in a case where the transmission request is received from the external device; and
    execute a shifting process of shifting the communication apparatus from the second state to the first state in a case that the communication apparatus is in the second state and the transmission request for data for the second screen is received from the external device, and not to execute the shifting process in a case that the communication apparatus is in the second state and the transmission request, for data for display of the first screen is received from the external device.

2. The communication apparatus according to claim 1, wherein, in a case that the communication apparatus is in the second state and the transmission request for data for the display of the first screen is received from the external device and is executed in response to an instruction from a user, the shifting process is executed.

3. The communication apparatus according to claim 1, wherein the transmission request for data for the display of the first screen is issued in a predetermined cycle by the external device that displays the first screen without a user operation to the external device that displays the first screen, and is not issued in the predetermined cycle by the external device that displays the second screen without a user operation to the external device that displays the second screen.

4. The communication apparatus according to claim 1,
wherein the first screen is a screen for remotely using the communication apparatus and showing the state of the communication apparatus, and
wherein the state of the communication apparatus is one or more of: a state of a printing agent of the communication apparatus, a printing medium of the communication apparatus, a radio field intensity of the communication apparatus, and a job progress of the communication apparatuses.

5. The communication apparatus according to claim 1, wherein the second screen is a screen for remotely using the communication apparatus and for setting the communication apparatus.

6. The communication apparatus according to claim 1, further comprising a display device and a CPU,
wherein the first state is a state in which the display device and the CPU are supplied with electric power, and
wherein the second state is a state in which the display device is not supplied with electric power, and the CPU is supplied with electric power.

7. The communication apparatus according to claim 1, wherein the at least one processor is further configured to print an image on a printing medium provided in the communication apparatus with a printing agent provided in the communication apparatus.

8. The communication apparatus according to claim 1, wherein the screen according to the transmission request is displayed on a display device of the external device in a case that the data for the display of the screen according to the transmission request is received by the external device.

9. The communication apparatus according to claim 1,
wherein in a case that the communication apparatus is in the second state and the transmission request for the data for the display of the second screen is received from the external device, the data for the display of the screen according to the transmission request is transmitted to the external device after the shifting process is executed,
wherein in a case that the communication apparatus is in the second state and the transmission request for the data for the display of the first screen is received from the external device, the shifting process is not executed or the data for the display of the screen according to the transmission request is not transmitted to the external device, and wherein in a case that the communication apparatus is in the first state and the transmission request for the data for the display of the first screen is received from the external device and in a case that the communication apparatus is in the first state and the transmission request for the data for the display of the second screen is received from the external device, the shifting process is not executed but the data for the display of the screen according to the transmission request is transmitted to the external device.

10. The communication apparatus according to claim 1, wherein the transmission request is transmitted from the external device by the external device receiving an input of information including an IP address from a user via a browser.

11. A control method executed in a communication apparatus capable of shifting to at least one of a first state and a second state in which less power is consumed than in the first state, the method comprising the steps of:
receiving a transmission request for data for display of a screen for remotely using the communication apparatus, from an external device capable of displaying the screen for remotely using the communication apparatus, wherein the screen for remotely using the communication apparatus includes a first screen and a second screen;
transmitting, to the external device, data for display of a screen according to the transmission request, in a case where the transmission request is received from the external device; and
executing shifting process for shifting the communication apparatus from the second state to the first state in a case that the communication apparatus is in the second state and the transmission request for data for the display of the second screen is received from the external device, and not executing the shifting process
in a case that the communication apparatus is in the second state and the transmission request for data for display of the first screen is received from the external device.

12. The control method according to claim 11, wherein, in a case that the communication apparatus is in the second state and the transmission request for data for the display of the first screen is received from the external device and is executed in response to an instruction from a user, the shifting process is executed.

13. The control method according to claim 11, wherein the transmission request for data for the display of the first screen is issued in a predetermined cycle by the external device that displays the first screen without a user operation to the external device that displays the first screen, and is not issued in the predetermined cycle by the external device that displays the second screen without a user operation to the external device that displays the second screen.

14. The control method according to claim 11,
wherein the first screen is a screen for remotely using the communication apparatus and showing a state of the communication apparatus, and
wherein the state of the communication apparatus is one or more of: a state of a printing agent of the communication apparatus, a printing medium of the communication apparatus, a radio field intensity of the communication apparatus, and a job progress of the communication apparatus.

15. The control method according to claim 11, wherein the second screen is a screen for remotely using the communication apparatus and for setting the communication apparatus.

16. The control method according to claim 11, wherein the communication apparatus further comprises a display device and a CPU,
wherein the first state is a state in which the display device and the CPU are supplied with electric power, and
wherein the second state is a state in which the display device is not supplied with electric power, and the CPU is supplied with electric power.

17. The control method according to claim 11, the method further comprising the step of printing an image on a printing medium provided in the communication apparatus with a printing agent provided in the communication apparatus.

18. The control method according to claim 11,
wherein in a case that the communication apparatus is in the second state and the transmission request for the data for the display of the second screen is received from the external device, the data for the display of the screen according to the transmission request is transmitted to the external device after the shifting process is executed,
wherein in a case that the communication apparatus is in the second state and the transmission request for the data for the display of the first screen is received from the external device, the shifting process is not executed or the data for the display of the screen according to the transmission request is not transmitted to the external device, and
wherein in a case that the communication apparatus is in the first state and the transmission request for the data for the display of the first screen is received from the external device and in a case that the communication apparatus is in the first state and the transmission request for the data for the display of the second screen is received from the external device, the shifting process is not executed but the data for the display of the screen according to the transmission request is transmitted to the external device.

19. The control method according to claim 11, wherein the transmission request is transmitted from the external device by the external device receiving an input of information including an IP address from a user via a browser.

20. A non-transitory computer readable storage medium storing instructions which, when executed, cause a communication apparatus to perform a process, the communication apparatus capable of shifting to at least one of a first state and a second state in which less power is consumed than in the first state, the process comprising:
receiving a transmission request for data for display of a screen for remotely using the communication apparatus, from an external device capable of displaying the screen for remotely using the communication apparatus, wherein the screen for remotely using the communication apparatus includes a first screen and a second screen;
transmitting, to the external device, data for display of a screen according to the transmission request, in a case where the transmission request is received from the external device; and
executing shifting process for shifting the communication apparatus from the second state to the first state in a case that the communication apparatus is in the second state and the transmission request for data for the display of the second screen is received from the external device, and not executing the shifting process in a case that the communication apparatus is in the second state and the transmission request for data for display of the first screen is received from the external device.

* * * * *